(12) United States Patent
Hirayama et al.

(10) Patent No.: US 11,231,067 B2
(45) Date of Patent: Jan. 25, 2022

(54) BEARING MEMBER (71) Applicant: NISSAN MOTOR CO., LTD., Yokohama (JP)

(72) Inventors: Hayato Hirayama, Kanagawa (JP); Yutaka Mabuchi, Kanagawa (JP); Tsuyoshi Higuchi, Kanagawa (JP); Takemichi Yamashita, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/052,848

(22) PCT Filed: May 10, 2018

(86) PCT No.: PCT/JP2018/018099
§ 371 (c)(1),
(2) Date: Nov. 4, 2020

(87) PCT Pub. No.: WO2019/215867
PCT Pub. Date: Nov. 14, 2019

(65) Prior Publication Data
US 2021/0239156 A1    Aug. 5, 2021

(51) Int. Cl.
*F16C 17/02* (2006.01)
*F16C 33/12* (2006.01)
*F16C 33/20* (2006.01)

(52) U.S. Cl.
CPC ............ *F16C 17/02* (2013.01); *F16C 33/121* (2013.01); *F16C 33/125* (2013.01);
(Continued)

(58) Field of Classification Search
CPC .... F16C 9/02; F16C 9/04; F16C 17/02; F16C 33/16; F16C 33/33; F16C 33/121;
(Continued)

(56) References Cited

U.S. PATENT DOCUMENTS

| | | | | |
|---|---|---|---|---|
| 2,887,766 A | * | 5/1959 | Fike | F16C 33/14 |
| | | | | 428/647 |
| 3,238,601 A | * | 3/1966 | White | B05D 5/083 |
| | | | | 29/898.058 |
| 3,418,028 A | * | 12/1968 | Watson | F16C 33/043 |
| | | | | 384/297 |
| 4,579,712 A | | 4/1986 | Mori | |
| 4,618,270 A | * | 10/1986 | Kraus | F16C 32/0662 |
| | | | | 384/114 |
| 4,632,223 A | * | 12/1986 | Maurer | F16C 17/24 |
| | | | | 184/6.1 |

(Continued)

FOREIGN PATENT DOCUMENTS

| | | | | |
|---|---|---|---|---|
| CN | 109555790 A | * | 4/2019 | ............. F16C 35/02 |
| FR | 1429483 A | * | 2/1966 | ............. F16C 33/24 |

(Continued)

*Primary Examiner* — Marcus Charles
(74) *Attorney, Agent, or Firm* — Foley & Lardner LLP (57) ABSTRACT

A bearing member 1 is provided with a coating layer 3 on an inner circumferential surface of a shaft hole 1A into which a shaft body 2 is to be fitted. The coating layer 3 is composed of a metal base material 3A and a heat conductive material 3B that is dispersed in the base material 3A and that has a thermal conductivity relatively higher than that of the base material 3A. The heat conductive material 3B has lengths Lb and Lc in directions B and C along a surface of the coating layer 3, longer than a length La in a thickness direction A of the coating layer 3, whereby thermal conductive characteristics in the directions B and C along the inner circumferential surface of the shaft hole 1A are enhanced. Thus, heat dissipation is improved, whereby temperature rise due to sliding contact with the shaft body 2 is suppressed, and seizure resistance is improved.

20 Claims, 9 Drawing Sheets

(52) U.S. Cl.
CPC ........ *F16C 33/206* (2013.01); *F05C 2251/04* (2013.01); *F16C 2202/04* (2013.01); *F16C 2204/10* (2013.01); *F16C 2204/20* (2013.01); *F16C 2240/06* (2013.01); *F16C 2360/22* (2013.01)

(58) Field of Classification Search
CPC .... F16C 33/124; F16C 22/125; F16C 33/205; F16C 43/02; F16C 2202/04; F16C 2202/24; F16C 2204/10; F16C 2204/20; F16C 2240/06; F16C 2240/18; F16C 2240/48; F16C 2240/54; F16C 2240/60; F16C 2360/22; F05C 2251/04
USPC ........ 384/297, 276, 907; 428/564, 568, 923, 428/926, 931
See application file for complete search history.

(56) References Cited

U.S. PATENT DOCUMENTS

| | | | |
|---|---|---|---|
| 5,434,012 A | 7/1995 | Tanaka et al. | |
| 9,624,645 B2* | 4/2017 | Choi | F16C 33/208 |
| 2010/0207055 A1 | 8/2010 | Ueno et al. | |
| 2017/0081522 A1* | 3/2017 | Adam | C09D 7/61 |

FOREIGN PATENT DOCUMENTS

| | | | | |
|---|---|---|---|---|
| JP | 49-54211 A | | 5/1974 | |
| JP | 59-177341 A | | 10/1984 | |
| JP | 6-94037 A | | 4/1994 | |
| JP | 09222143 A | * | 8/1997 | ......... C01M 103/02 |
| WO | WO 2009/051094 A1 | | 4/2009 | |
| WO | WO-2010038588 A1 | * | 4/2010 | ............ F16C 23/041 |
| WO | WO-2014126202 A1 | * | 8/2014 | ............ C08G 73/14 |
| WO | WO-2019175924 A1 | * | 9/2019 | ............ F16C 33/206 |

* cited by examiner

BEARING MEMBER

TECHNICAL FIELD

The present invention relates to a bearing member that is used as a sliding bearing, for example, at a rotational sliding part of an automobile engine.

BACKGROUND ART

One of conventional bearing members is disclosed in, for example, Patent Document 1. The bearing member disclosed in Patent Document 1 is used in, e.g., an internal-combustion engine of an automobile. This bearing member is a multi-layered sliding bearing that has an alloy overlying bearing layer with a thickness of 3 to 50 m on a surface of a copper alloy layer with specific degrees of coefficient of thermal expansion, thermal conductivity, and yield strength. This bearing member is made to have high followability to deformation of an aluminum alloy bearing housing and to have excellent heat dissipation.

CITATION LIST

Patent Document

Patent Document 1: JPH6-94037A

SUMMARY OF INVENTION

Technical Problem

However, in a case of using the conventional bearing member as described above, as a main metal or a connecting rod metal of an automobile engine, the bearing member comes into rotational sliding contact with a shaft body while receiving a load in an axial direction of a connecting rod, whereby the bearing member locally has a high-temperature region between the bearing member and the shaft body due to frictional heat and can cause a seizure due to the frictional heat. In particular, when an axial length is reduced as one of measures to reduce weight of an engine, such a bearing member tends to have a frictional force that increases in accordance with increase in surface pressure and to easily generate a seizure. For this reason, conventional bearing members are desired to be improved in seizure resistance.

The present invention has been made in view of the conventional circumstances, and an object of the present invention is to provide a bearing member having enhanced thermal conductive characteristics in directions along an inner circumferential surface of a shaft hole (directions including an axial direction and a circumferential direction) and thus having improved heat dissipation, whereby temperature rise due to rotational sliding contact with a shaft body is suppressed, and seizure resistance is improved.

Solution to Problem

The bearing member of the present invention includes a coating layer on an inner circumferential surface of a shaft hole into which a shaft body is to be fitted. The coating layer contains a metal base material and a heat conductive material that is dispersed in the base material and that has a thermal conductivity relatively higher than that of the base material. In this bearing member, the heat conductive material has a length in a direction along a surface of the coating layer, longer than a length in a thickness direction of the coating layer, and has a length in a circumferential direction of the shaft hole, longer than a length in an axial direction of the shaft hole.

Advantageous Effects of Invention

The bearing member of the present invention, which has the above-described structure, has enhanced thermal conductive characteristics in directions along the inner circumferential surface of the shaft hole, due to the coating layer formed by dispersing the heat conductive material in the base material. Thus, heat dissipation is improved, whereby temperature rise due to rotational sliding contact with the shaft body is suppressed, and seizure resistance is improved.

DESCRIPTION OF EMBODIMENTS

First Embodiment

Figure 1:
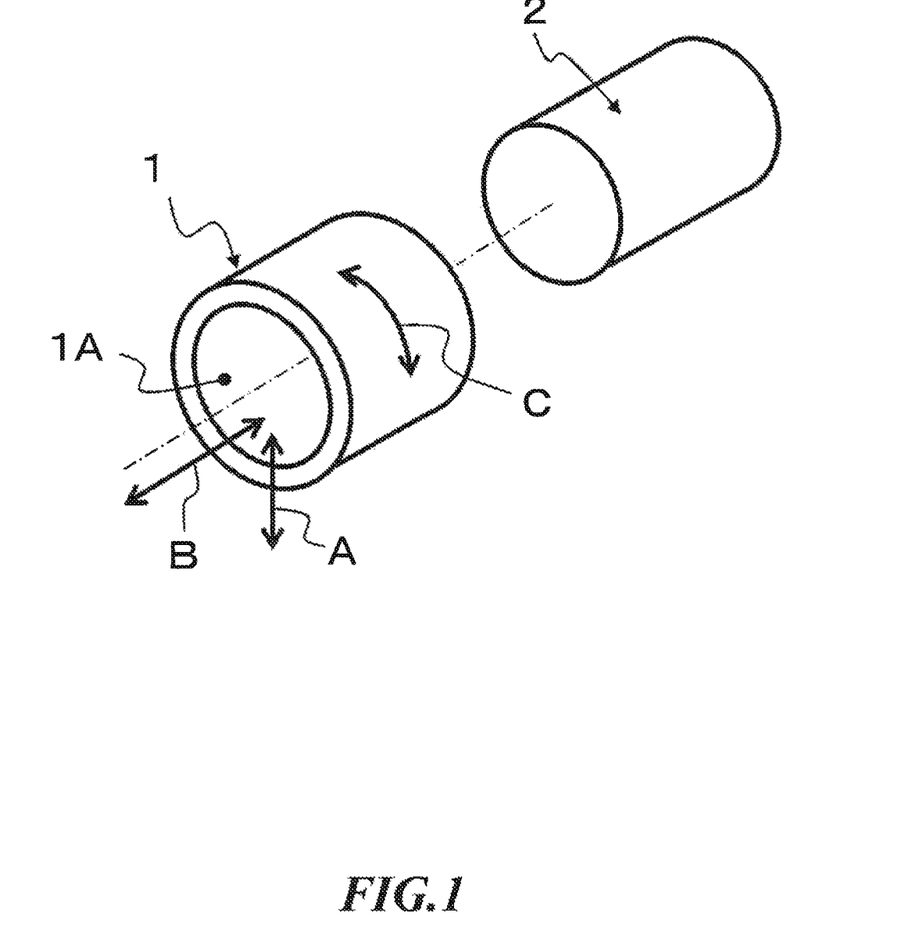
FIG. 1 is a perspective view for illustrating a first embodiment of a bearing member according to the present invention.
Figure 2:
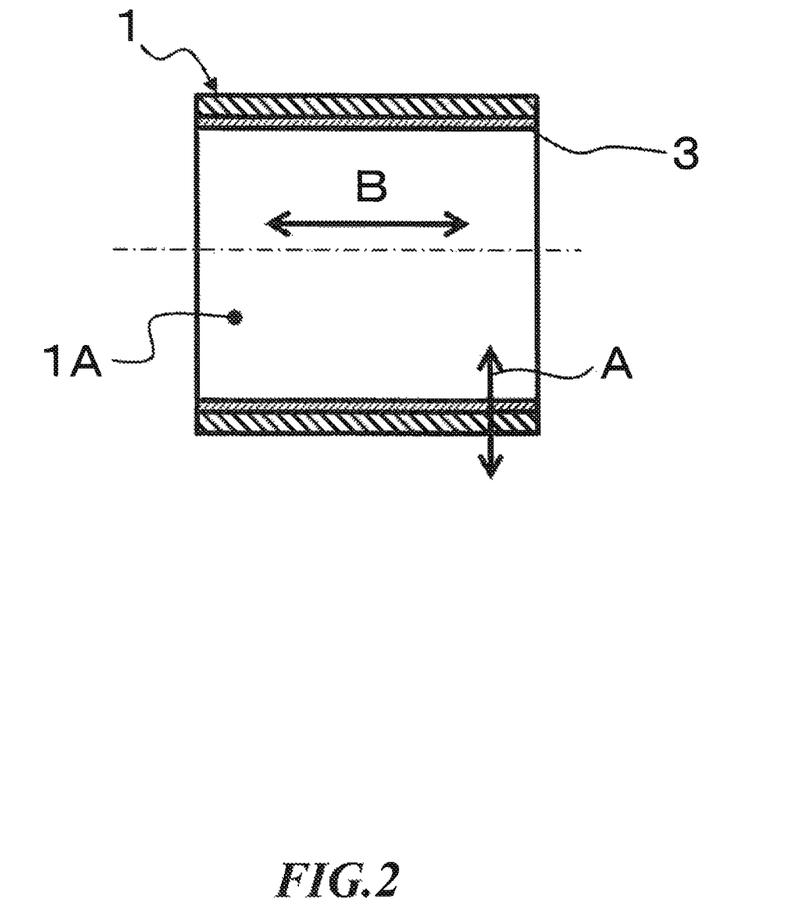
FIG. 2 is a sectional view (B) of the bearing member illustrated in FIG. 1.
Figure 3:
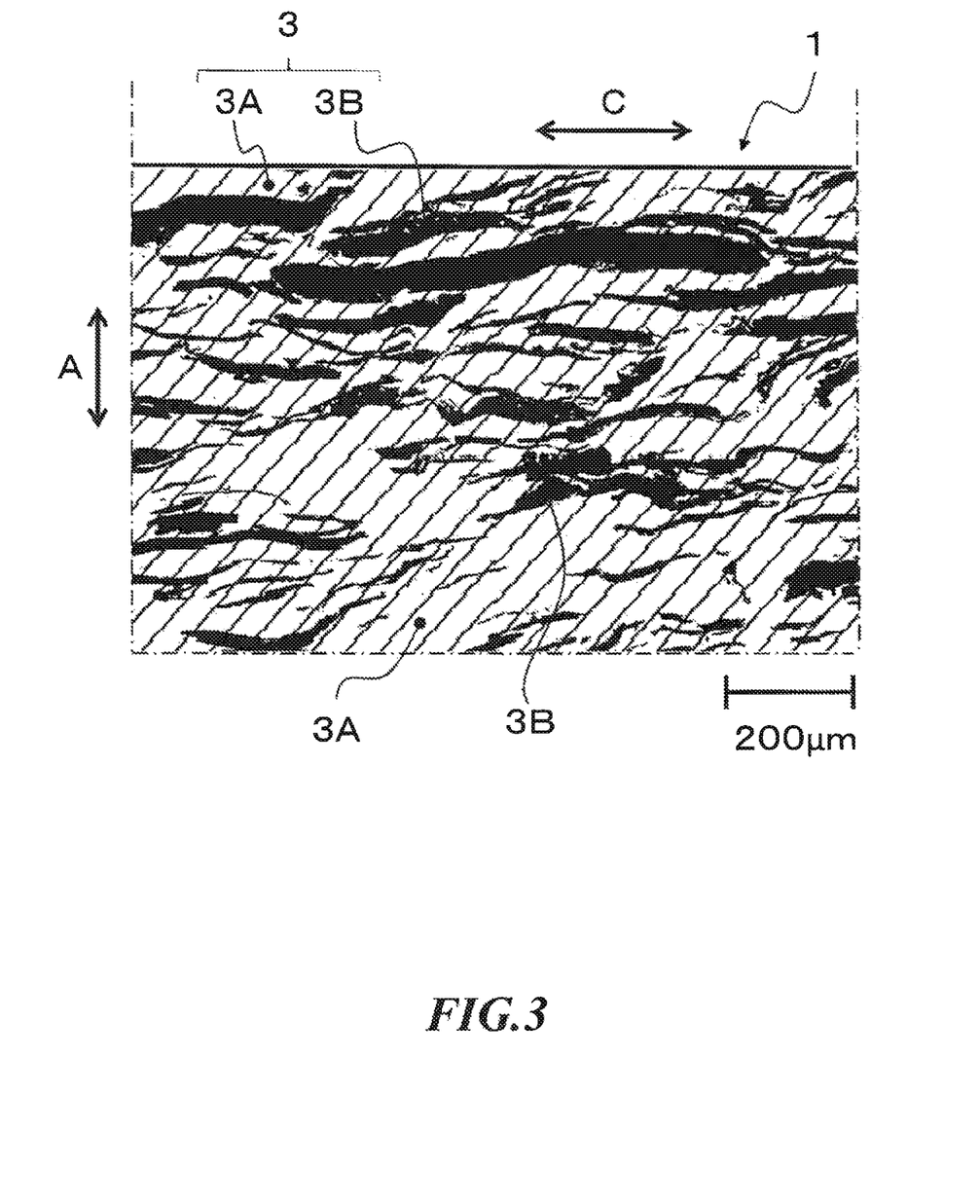
FIG. 3 is an enlarged sectional view of a coating layer in a direction orthogonal to an axial line.

A bearing member 1 illustrated in FIGS. 1 and 2 includes a coating layer 3 on an inner circumferential surface of a shaft hole 1A into Which a shaft body 2 is to be fitted. As illustrated in FIG. 3, the coating layer 3 is composed of a metal base material 3A and a heat conductive material 3B that is dispersed in the base material 3A and that has a thermal conductivity relatively higher than that of the base material 3A.

Figure 4:
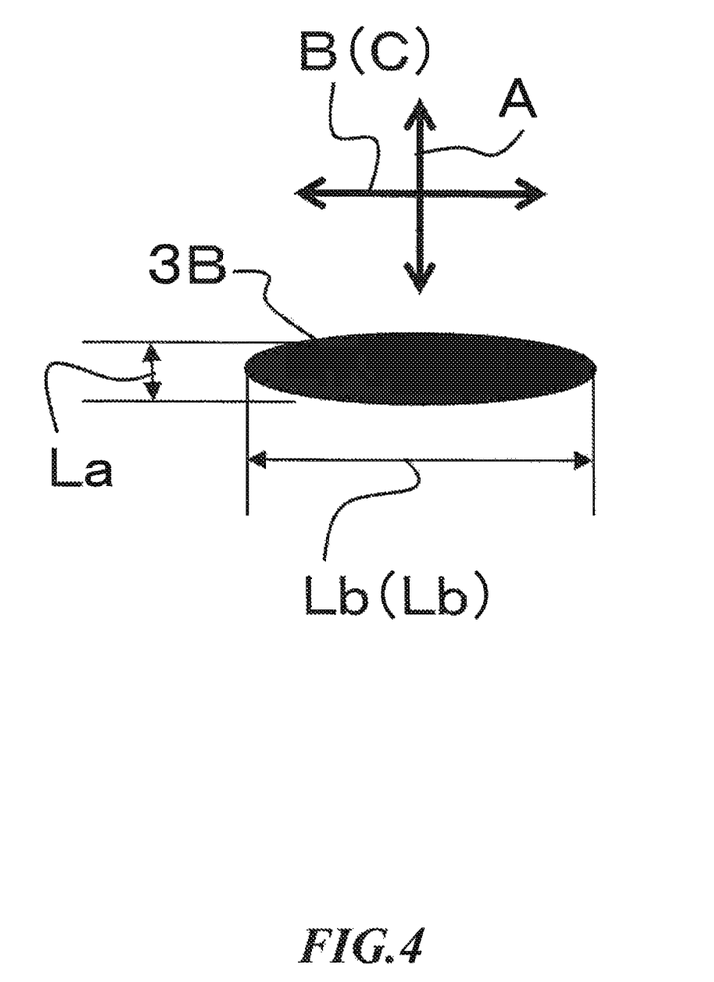
FIG. 4 is a plane view illustrating a flatness ratio of a heat conductive material in an axial direction and a thickness direction of the coating layer.

As illustrated in FIG. 4, the heat conductive material 3B is structured so as to have lengths Lb and Lc in directions (B and C) along a surface of the coating layer 3, longer than a length La in a thickness direction A of the coating layer 3. The directions (B and C) along the surface of the coating layer 3 are an axial direction B of the shaft hole 1A and a direction along a surface (tubular curved surface) containing a circumferential direction C of the shaft hole 1A. In short, the heat conductive material 3B is flat in such a manner as to extend in the directions along the surface of the coating layer 3.

A back plate (base plate) of the bearing member 1 is not specifically limited in material, but, for example, steel, such as a cold-rolled steel plate (SPCC), can be adopted. The base material 3A for forming the coating layer 3 is not specifically limited in material, but, at least one of, typically, copper, copper alloy, aluminum, or aluminum alloy, can be adopted as a material having good thermal conductive characteristics. In a case in which the base material 3A is made of at least one of copper, copper alloy, aluminum, or aluminum alloy, Vickers hardness is desirably 45 HV or greater, in consideration of wear resistance.

The heat conductive material 3B for forming the coating layer 3 is, basically, any material that has a thermal conductivity higher than that of the base material 3A. As a typical material with superior thermal conductive characteristics, for example, a carbon material, e.g., low crystallinity carbon such as soft carbon or hard carbon, carbon black such as Ketjen black, acetylene black, channel black, ramp black, oil furnace black, or thermal black, fullerene, carbon nanotube, carbon nanofiber, carbon nanohorn, carbon fibril, graphite, or graphene, can be adopted. In particular, graphite or graphene is preferably used from the point of view of thermal conductive characteristics in the directions (B and C) along the surface of the coating layer 3.

As described above, the heat conductive material 3B is made to have the lengths Lb and Lc in the directions (B and C) along the surface of the coating layer 3, longer than the length La in the thickness direction A of the coating layer 3. Note that, among the entirety of the heat conductive material 3B dispersed in the base material 3A, at least a specific ratio of the amount of the heat conductive material 3B should satisfy the above-described length relationship. Preferably, 50% or greater, or more preferably, 80% or greater, of the heat conductive material 3B is made to be longer in the lengths Lb and Lc in the directions (B and C) along the surface of the coating layer 3.

Figure 5:
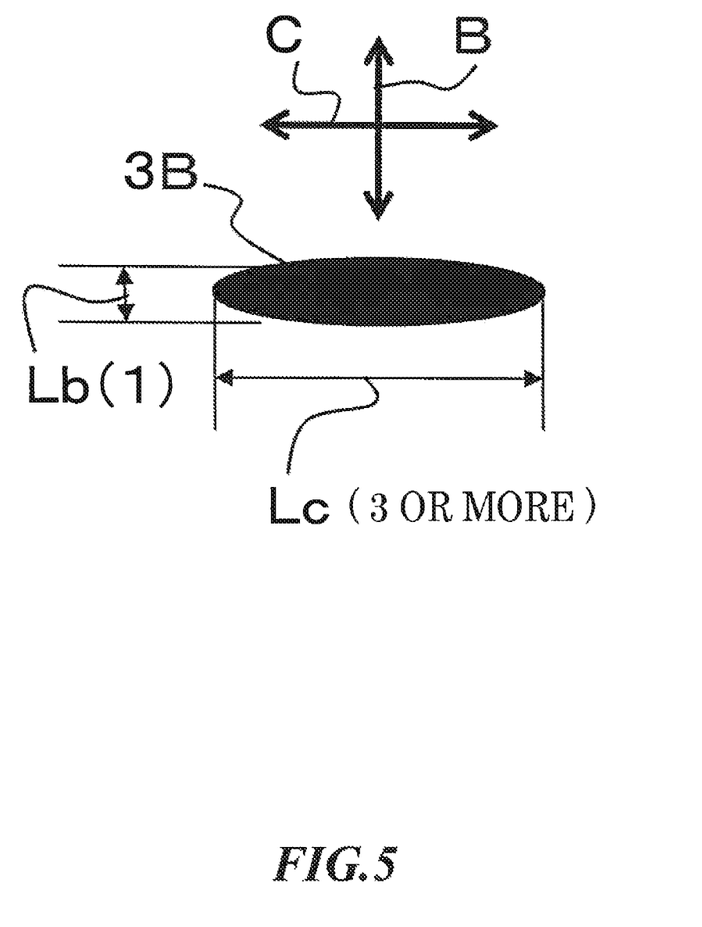
FIG. 5 is a plane view illustrating a flatness ratio of the heat conductive material in the axial direction and a circumferential direction of the coating layer.

Moreover, as illustrated in FIG. 5, the heat conductive material 3B is preferably longer in the length Lc in the circumferential direction C of the shaft hole 1A than the length Lb in the axial direction B of the shaft hole 1A. The heat conductive material 3B is more preferably three times or more longer in the length Lc in the circumferential direction C than the length Lb in the axial direction B.

The distribution density of the heat conductive material 3B is relatively high in a surface-side region of the coating layer 3 in the thickness direction A of the coating layer 3, as illustrated in FIG. 3. More specifically, the amount of the heat conductive material 3B gradually decreases in such a manner that the distribution density varies from high to low as it goes from the surface of the coating layer 3 to the center of the shaft hole 1A.

The coating layer 3 more preferably has a thermal conductivity of 90 W/m·k or greater in the directions (B and C) along the surface. Moreover, the heat conductive material 3B is more preferably dispersed at a ratio of 15 wt % or greater and 90 wt % or less with respect to the base material 3A and is further preferably dispersed at a ratio of 20 wt % or greater and 40 wt % or less with respect to the base material 3A.

The coating layer 3 illustrated in FIG. 3 has a thermal conductivity of 200 W/m·k in the directions (B and C) along its surface and contains the heat conductive material 3B at a ratio of 20 wt %. In this coating layer 3, the distribution density of the heat conductive material 3B is relatively high in the surface-side region in the thickness direction A, as described above. In addition, in this coating layer 3, the exposure rate of the heat conductive material 3B at the surface is 7.4%.

Figure 6:
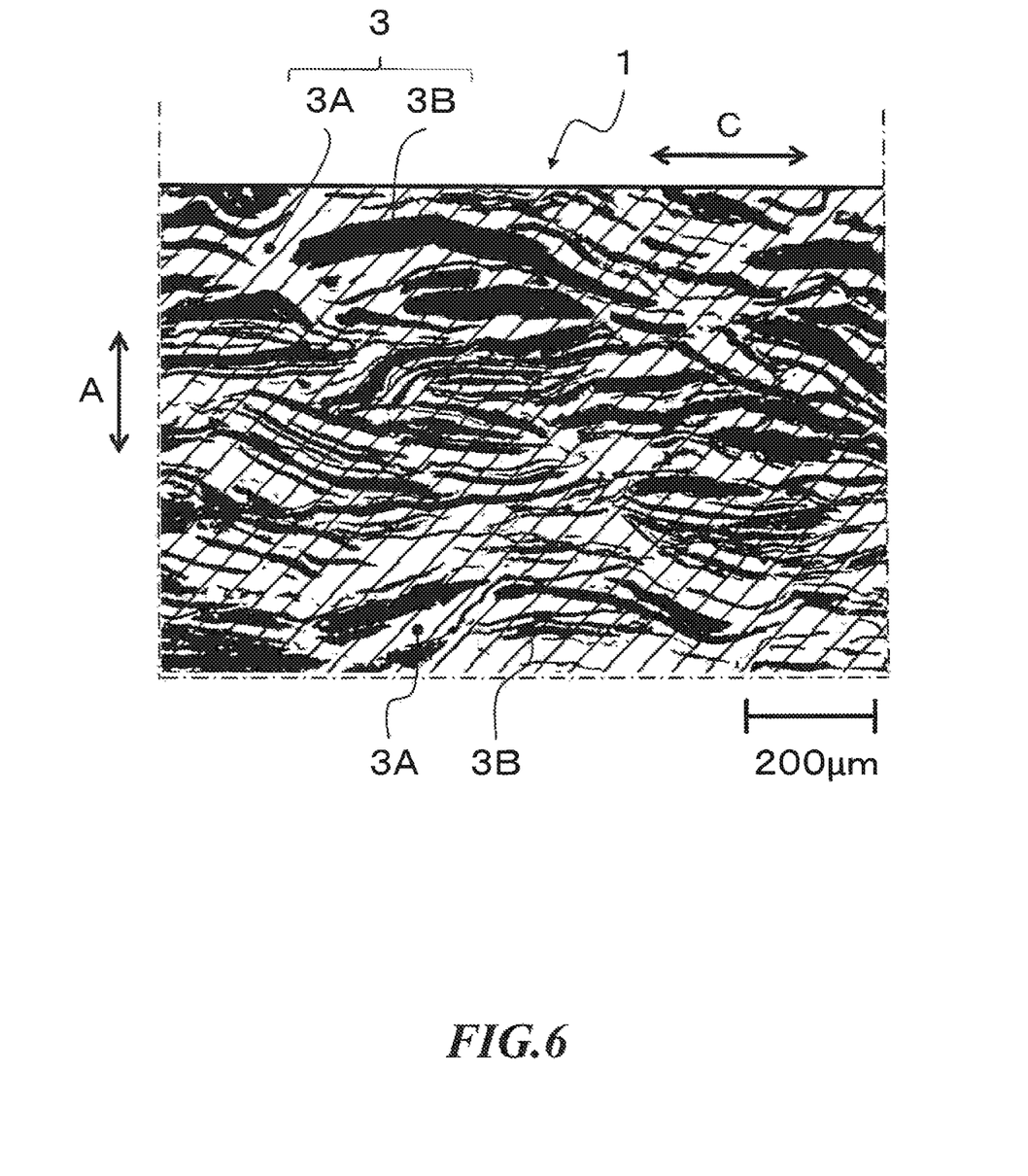
FIG. 6 is an enlarged sectional view of a coating layer containing the heat conductive material at a ratio of 60 wt %.

The coating layer 3 illustrated in FIG. 6 has a thermal conductivity of 400 W/m·k in the directions (B and C) along its surface and contains the heat conductive material 3B at a ratio of 60 wt %. In this coating layer 3, the distribution density of the heat conductive material 3B is approximately uniform in the thickness direction. A. In addition, in this coating layer 3, the exposure rate of the heat conductive material 3B at the surface is 22.6%.

Figure 7:
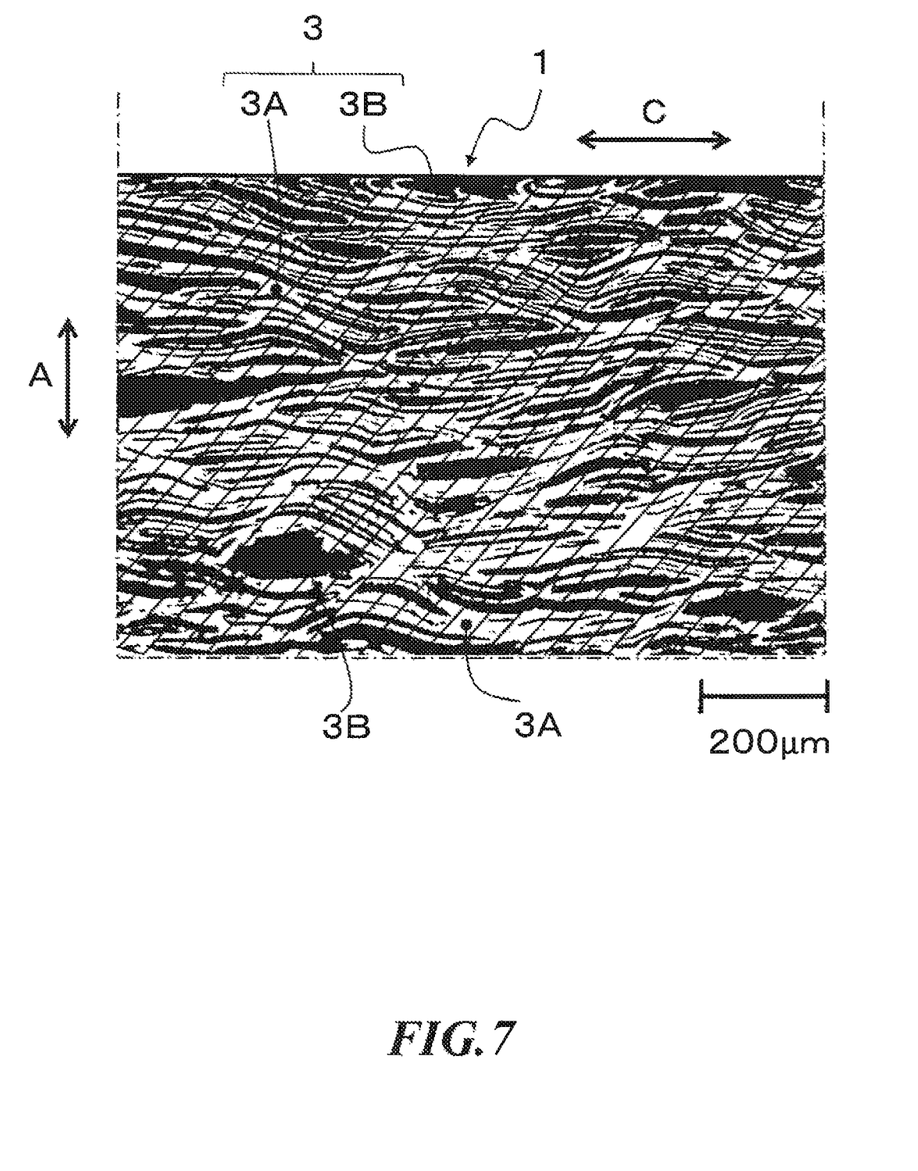
FIG. 7 is an enlarged sectional view of a coating layer containing the heat conductive material at a ratio of 80%.

The coating layer 3 illustrated in FIG. 7 has a thermal conductivity of 600 W/m·k in the directions (B and C) along its surface and contains the heat conductive material 3B at a ratio of 80 wt %. In this coating layer 3, the distribution density of the heat conductive material 3B is approximately uniform in the thickness direction A. In addition, in this coating layer 3, the exposure rate of the heat conductive material 3B at the surface is 49.5%.

The coating layer 3 may be provided with an over coating layer on the surface. This over coating layer is an ordinary surface treated layer that is applied on an inner circumferential surface of a bearing, and for example, the over coating layer is a plated layer of silver, bismuth, or the like.

More preferably, the bearing member 1 has a surface roughness Ra of 0.3 μm or less at the inner circumferential surface of the shaft hole 1A, that is, at the surface of the coating layer 3, and the bearing member 1 has an exposure rate of the heat conductive material 3B of 5% or greater and 60% or less at the surface of the coating layer 3.

The bearing member 1 having the above-described structure can be used as, for example, a sliding bearing, such as a main metal or a connecting rod metal of an automobile engine. In a case of forming such a bearing member 1 having a relatively small diameter, after a coating layer 3 is formed on a flat back plate, this back plate is then bent into a cylindrical shape, and ends are joined together by welding or the like. In a case of forming a bearing member 1 having a relatively large diameter, after a coating layer 3 is formed on a flat back plate, this back plate is bent into a semicircular shape to form a segment, and ends of two segments are joined together into a cylindrical shape.

In a case of using the bearing member 1 as a constitutional part of an automobile engine, the bearing member 1 is used with lubricating oil containing friction modifier, such as molybdenum dithiocarbamate (MODTC), and the bearing member 1 rotates relative to the shaft body 2 in a sliding contact manner in the condition in which the lubricating oil is interposed between the inner circumferential surface of the shaft hole 1A and the shaft body 2.

In the case of using the bearing member 1 as a main metal or a connecting rod metal of an automobile engine, the bearing member 1 comes into rotational sliding contact with a shaft body while receiving a load in an axial direction of a connecting rod. This generates a local high-temperature region between the bearing member 1 and the shaft body (for example, a crank pin) 2, due to frictional heat. This local high-temperature region occurs by a force acting in the axial direction of the connecting rod, and the local high-temperature region shifts in the circumferential direction of the shaft hole 1A in accordance with relative rotation of the bearing member 1 and the shaft body 2.

Meanwhile, the bearing member 1 described in the foregoing embodiment has the coating layer 3 that is composed of the metal base material 3A and the heat conductive material 3B, on the inner circumferential surface of the shaft hole 1A. The heat conductive material 3B makes the lengths Lb and Lc in the directions (B and C) along the surface of the coating layer 3, longer than the length La in the thickness direction A of the coating layer 3.

Thus, in the bearing member 1, due to high thermal conductive characteristics of the coating layer 3 itself, the shaft hole 1 provided with this coating layer 3 has enhanced thermal conductive characteristics in the directions (B and C) along the inner circumferential surface, whereby heat dissipation is improved. As a result, temperature rise due to rotational sliding contact with the shaft body 2 is suppressed, and seizure resistance is improved.

The bearing member 1 enables reduction of an axial length as one of measures to reduce weight of an engine. That is, in a case of reducing the axial length of the bearing member 1, frictional force increases with increase in surface pressure. However, the bearing member 1, which has high thermal conductive characteristics, suppresses heat that is generated by friction. Thus, the bearing member 1 enables reduction of the axial length while securing sufficient seizure resistance, and therefore, the bearing member 1 can contribute to reduction of weight of an engine.

The bearing member 1, when used with lubricating oil containing friction modifier, effectively transmits heat to the lubricating oil. The temperature rise suppressing function of the bearing member 1 itself, and the frictional force reduction and cooling function of the lubricating oil, in combination, enable further improvement in seizure resistance.

In the bearing member 1, the heat conductive material 3B is made so as to have the length Lc in the circumferential direction C of the shaft hole 1A, longer than the length Lb in the axial direction B of the shaft hole 1A, and more preferably, the heat conductive material 3B is made so as to have the length Lc in the circumferential direction C of the shaft hole 1A, three times or more longer than the length Lb in the axial direction B of the shaft hole 1A. This structure enhances thermal conductive characteristics, especially in the circumferential direction C of the shaft hole 1. Thus, the bearing member 1 is effective when being used as a main metal or a connecting rod metal of an automobile engine.

That is, in the case of using the bearing member 1 as a main metal or a connecting rod metal, the local high-temperature region shifts in the circumferential direction of the shaft hole 1A, as described above. In view of this, the bearing member 1 is made to have enhanced thermal conductive characteristics in the shifting direction (circumferential direction C), whereby heat of the local high-temperature region is effectively dissipated, and seizure resistance is further improved.

In the bearing member 1, the distribution density of the heat conductive material 3B is relatively high in the surface-side region of the coating layer 3, in the thickness direction A of the coating layer 3. Thus, thermal conductive characteristics of the surface-side region where temperature easily rises high, are mainly enhanced, and seizure resistance is further improved, by using the least possible amount of the heat conductive material 3B.

The bearing member 1 has a thermal conductivity of 90 W/m·k or greater in the directions (B and C) along the surface of the coating layer 3. This effectively enhances thermal conductive characteristics in the directions (B and C) along the surface of the coating layer 3, in conjunction with conditions such as the materials of the base material 3A and the heat conductive material 3B, and the flatness ratio of the heat conductive material 3B.

In the bearing member 1, the heat conductive material 3B is dispersed at a ratio of 15 wt % or greater and 90 wt % or less with respect to the base material 3A. If the ratio of the heat conductive material 3B is less than 15 wt %, it may be difficult to secure sufficient thermal conductive characteristics of the whole coating layer 3. On the other hand, if the ratio of the heat conductive material 3B exceeds 90 wt %, the total amount of the base material 3A is insufficient, and wear resistance may be decreased. From these points of view, in the bearing member 1, the heat conductive material 3B is dispersed at a ratio of 15 wt % or greater and 90 wt % or less with respect to the base material, in order to achieve both sufficient thermal conductive characteristics and sufficient wear resistance of the coating layer 3 as a whole.

In addition, in the bearing member 1, dispersing the heat conductive material 3B at a ratio of 20 wt % or greater and 40 wt or less with respect to the base material 3A increases the thermal conductivity of the coating layer 3 and increases interfaces between the base material 3A and the heat conductive material 3B, and therefore, this is effective in further increasing durability and strength.

Moreover, making the bearing member 1 have an over coating layer on the surface of the coating layer 3 improves corrosion resistance and elongates the service life of the bearing member 1 as a part.

The bearing member 1 has a surface roughness Ra of 0.3 µm or less at the inner circumferential surface of the shaft hole 1A, whereby the inner circumferential surface is smooth, and frictional resistance is reduced. This further enhances the effect for suppressing temperature rise by the clothing layer 3 composed of the base material 3A and the heat conductive material 3B.

In the bearing member 1, the exposure rate of the heat conductive material 3B is 5% or greater and 60% or less at the surface of the coating layer 3. If the exposure rate of the heat conductive material 3B is less than 5%, thermal conductive characteristics at the surface of the coating layer 3 may be insufficient. On the other hand, if the exposure rate of the heat conductive material 3B exceeds 60%, the ratio of the base material 3A at the surface is insufficient, and wear resistance may be decreased. From these points of view, in the bearing member 1, the exposure rate of the heat conductive material 3B at the surface of the coating layer 3 is set to 5% or greater and 60% or less, whereby both sufficient thermal conductive characteristics and sufficient wear resistance of the coating layer 3 are achieved.

When the bearing member 1 is relatively rotated in a state in which the shaft body 2 is fitted into the shaft hole 1A, the heat conductive material 3B forming the coating layer 3 is transferred to an outer circumferential surface of the shaft body 2 over time. This transferring imparts good thermal conductive characteristics due to the heat conductive material 3B, also to the outer circumferential surface of the shaft body 2, whereby heat dissipation is also improved. Thus, a rotational sliding mechanism constituted of the bearing member 1 and the shaft body 2 can have a structure that has high thermal conductive characteristics and high heat dissipation at mutual sliding surfaces and thereby achieves superior seizure resistance.

EXAMPLES

Copper powder as a base material and graphite as a heat conductive material were stacked as a coating layer, on a surface of a back plate (SPCC plate) with a 1 mm thickness, and they were formed so as to have a uniform height. This formed body was heated at 800° C. in an electric furnace, and the back plate, the base material, and the heat conductive material were joined by diffusion of atoms, whereby a coating layer composed of the base material and the heat conductive material was formed on the surface of the back plate. Thereafter, the surface roughness of the coating layer and the exposure rate of the heat conductive material at the surface were controlled by machining, and an over coating layer was formed on the surface of the coating layer as necessary.

Examples of the present invention and Comparative Example were subjected to a reciprocating sliding test that simulated a condition of lacking an oil film. This test used a reciprocating sliding test apparatus illustrated in FIG. 8. The reciprocating manual test apparatus illustrated in the drawing includes a head 12, an air cylinder 13, and a table 14. The head 12 is held by a frame 11 in a vertically movable manner. The air cylinder 13 downwardly pressurizes the head 12. The table 14 is reciprocatable in a horizontal direction under the head 12.

Figure 8:
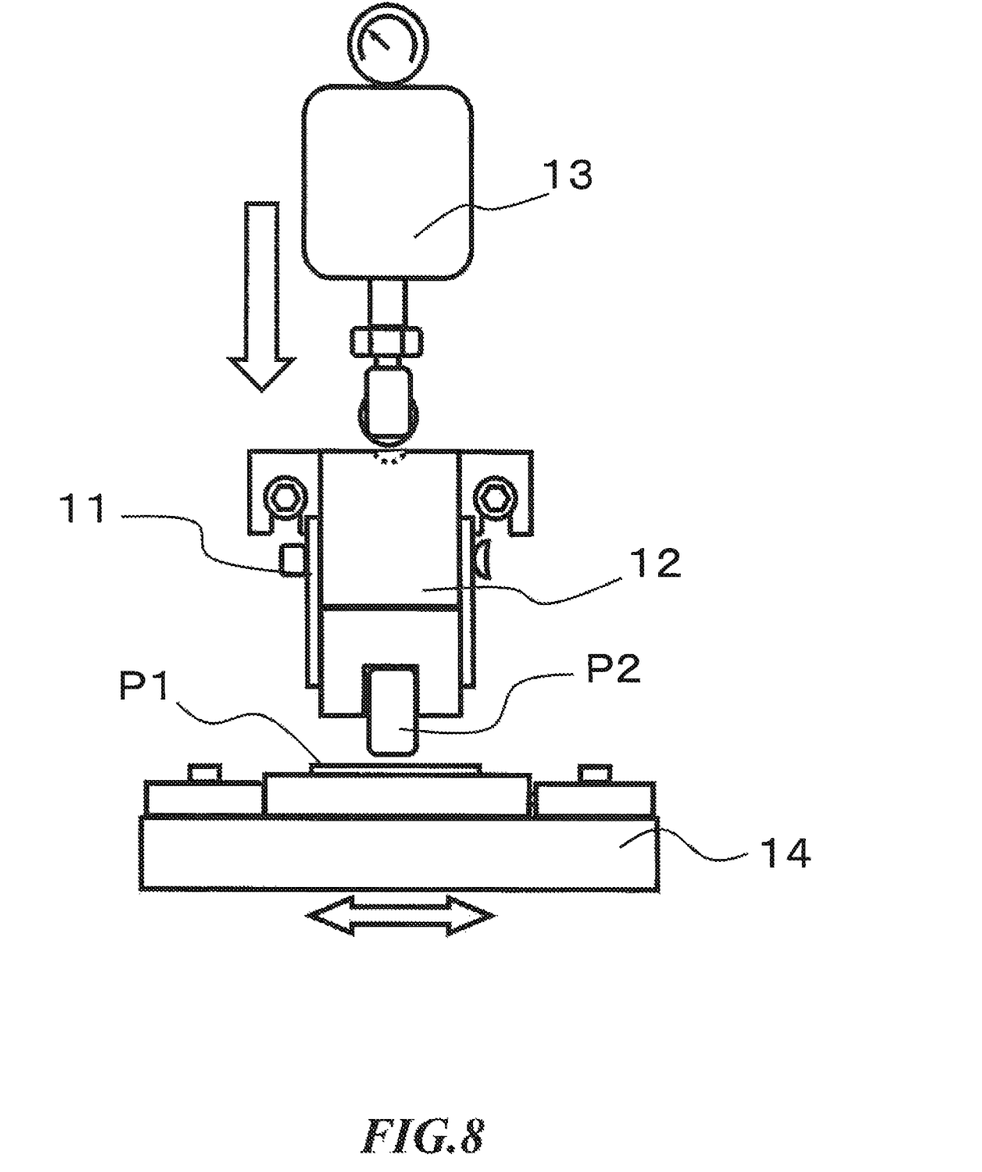
FIG. 8 is a front view for illustrating a sliding test apparatus.

In the reciprocating sliding test apparatus, a test piece P1 of the bearing member was fixed on the table 14, and a test piece P2 of a shaft body was fixed at a lower end part of the head 12. Under these conditions, in the reciprocating sliding test apparatus, the head 12 was lowered by the air cylinder 13 to bring the test piece P2 of the shaft body into contact with the test piece P1 of the bearing member on the table 14 by a predetermined load, while the table 14 was reciprocated in one direction to vary the load from the test piece P2 of the shaft body to the test piece P1 of the bearing member.

In the test, the test piece P2 of the shaft body for each of Examples and Comparative Example was made so as to have an R shape that generates heat due to sliding and was attached with a thermocouple, and temperature was measured during sliding. The test piece of the shaft body was made of S45C material and had a curvature R of 300 mm, a length of 30 mm, and a surface roughness Ra of 0.03 μm. On the other hand, the test piece P1 of the bearing member had the coating layer, which was composed of sintered copper base material and graphite heat conductive material, and had dimensions of 66 mm×49 mm.

In the test, the movement speed of the table was 0.7 m/s, the reciprocation range was 20 mm, and the lubrication condition was such that one drop of 5w-30GF-4 general-purpose oil was applied. In the test, the table side was heated to 120° C. (high temperature: 160° C.), and a test stopping condition was set in such a manner that a frictional limiter would be activated when the frictional force continuously exceeded 120 N.

Each of Examples 1 to 6 had the copper base material and the graphite heat conductive material in the coating layer. Comparative Example 1 had only copper in the coating layer (containing no heat conductive material). Examples 1 to 4 and 6 had the heat conductive material at a ratio of 20 wt % in the coating layer, and Example 5 had the heat conductive material at a ratio of 4 wt %.

A ratio (Lb:Lc) of the length (Lb) in the axial direction (B) and the length (Lc) in the circumferential direction (C) of the heat conductive material, which are described by using FIG. 5, was 1:2 in each of Examples 2 and 4 to 6. The ratio was 1:1 in Example 1 and was 1:4 in Example 3.

Moreover, in Examples 1 to 3 and 5, a density relationship of the heat conductive material relative to the base material was not generated, that is, the distribution density of the heat conductive material was made uniform, in the thickness direction (A) of the coating layer. Example 4 had a distribution in which the density of the heat conductive material varied from high to low in a direction from the surface of the coating layer to the center of the shaft hole (refer to FIG. 3). In contrast to Example 4, Example 6 had a distribution in which the density of the heat conductive material varied from low to high.

The thermal conductivity of the coating layer was calculated by measuring a thermal diffusivity by a metal laser flash method (measured in accordance with "JIS 7801"). Vickers hardness of a base material part was measured as Vickers hardness of the base material, by using a Vickers hardness meter (measured in accordance with JIS G 0562). The surface roughness of the coating layer was measured by a stylus roughness meter, and arithmetic average roughness Ra (based on JIS B0601) was obtained. Moreover, the exposure rate of the heat conductive material at the surface of the coating layer was calculated by binarizing an image of the surface of the coating layer in an optical microscopic image containing an enlarged surface of the coating layer.

In the test, Examples 1 to 6 and Comparative Example 1 each were subjected to temperature measurement of a sliding part while a contact load of the test piece P2 of the shaft body was increased from 300 N to 1900 N by 200 N per 3 minutes in a stepwise manner. In each of Examples 1 to 6 and Comparative Example 1, it was confirmed that the test piece P1 of the bearing member had a surface roughness Ra of 0.3 μm or less. The test results of Examples 1 to 6 and Comparative Example 1 are shown in Table 1.

TABLE 1

|  | Example 1 | Example 2 | Example 3 | Example 4 | Example 5 | Example 6 | Comparative Example 1 |
| --- | --- | --- | --- | --- | --- | --- | --- |
| Load | 1900 N OK | 1900 N OK | 1900 N OK | 1900 N OK | 1900 N OK | 1900 N OK | 1500 N Stopped |
| Base Material | Copper | Copper | Copper | Copper | Copper | Copper | Copper |
| Heat Conductive Material | Graphite | Graphite | Graphite | Graphite | Graphite | Graphite | Not Used |
| Ratio of Heat Conductive Material (wt %) | 20 | 20 | 20 | 20 | 4 | 20 | — |
| Ratio of Lengths (Lb:Lc) | 1:1 | 1:2 | 1:4 | 1:2 | 1:2 | 1:2 | — |
| Density Relationship | No Relationship | No Relationship | No Relationship | Density varies from high to low | No Relationship | Density varies from low to high | — |
| Thermal Conductivity (W/m · k) | 200 | 225 | 243 | 238 | 60 | 234 | 50 |
| Hardness of Base Material (HV) | 57 | 57 | 57 | 57 | 57 | 57 | 57 |
| Sliding Part Temperature (° C.) | 47.1 | 46.1 | 45.9 | 45.8 | 56.3 | 47.2 | 79.3 |

Figure 9:
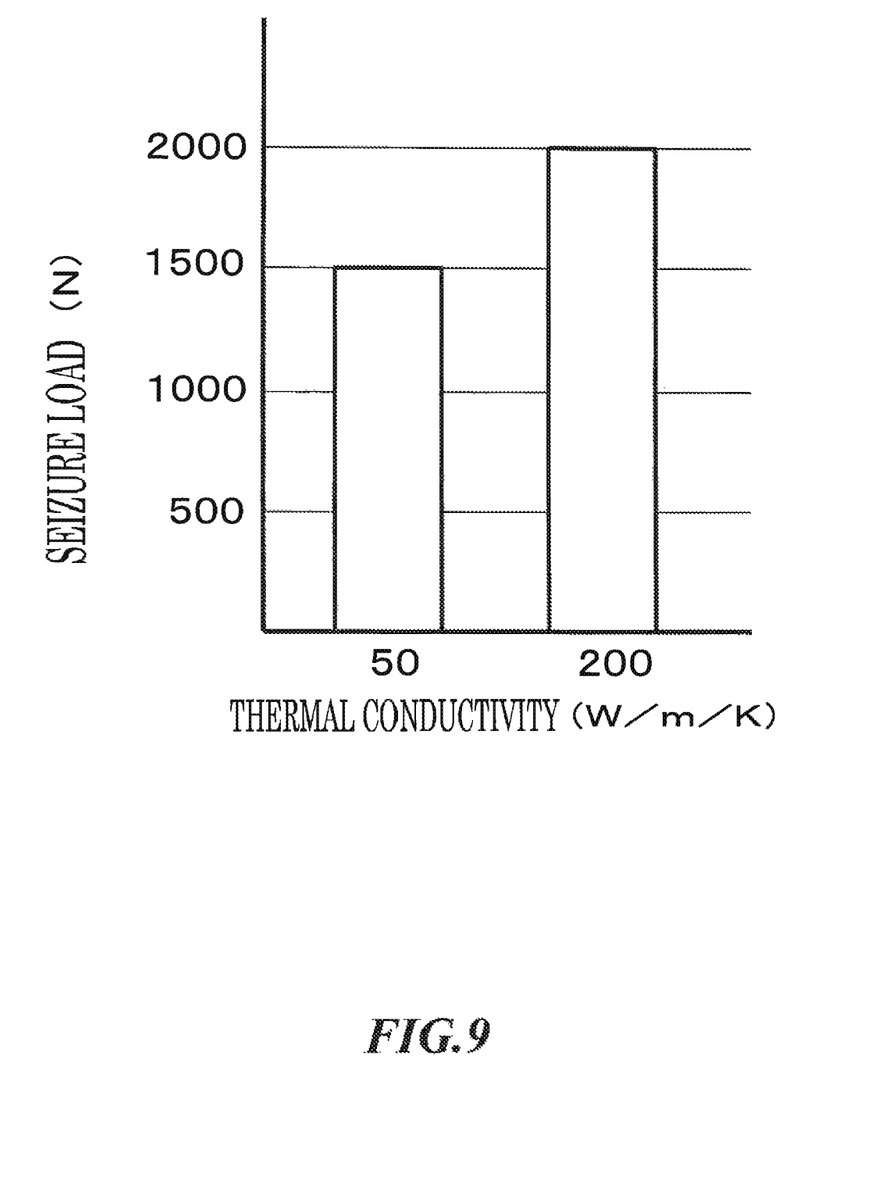
FIG. 9 is a graph illustrating seizure loads of a bearing member of the present invention and a conventional bearing member.

It is clear from FIG. 1 that each of Examples 1 to 6 did not cause a seizure even when the contact load of the test piece P2 of the shaft body was 1900 N. In contrast, Comparative Example 1 caused a seizure when the contact load of the test piece P2 was 1500 N. FIG. 9 illustrates a graph for comparing Comparative Example 1 and Example 1.

Table 1 shows that Comparative Example 1 had a thermal conductivity of 50 W/m·k and a sliding part temperature reached around 80° C. On the other hand, each of Examples 1 to 4 and 6 had a thermal conductivity of exceeding 200 W/m·k and exhibited a sliding part temperature of not more than 50° C. Thus, compared with Comparative Example 1, each of Examples 1 to 4 and 6 had obviously high thermal conductive characteristics, whereby heat dissipation was improved by the high thermal conductive performance, and the sliding part temperature was greatly decreased.

Example 5, in Which the ratio of the heat conductive material in the coating layer was smaller than those of other Examples 1 to 4 and 6, had a thermal conductivity of 60 W/m·k and exhibited a sliding part temperature of exceeding 50° C. However, in Example 5, the thermal conductivity was higher than that of Comparative Example 1, and the sliding part temperature was clearly lower than that of Comparative Example 1. That is, Example 5 showed a notable effect for decreasing temperature by the heat conductive material contained in the coating layer.

Example 1, in which the ratio (Lb:Lc) of the length in the axial direction and the length in the circumferential direction of the heat conductive material was 1:1, exhibited clearly high thermal conductive characteristics and a low sliding part temperature, compared with Comparative Example 1. This reveals the effectiveness of the heat conductive material.

Each of Examples 2, 4, and 6, in which the ratio (Lb:Lc) of the length in the axial direction and the length in the circumferential direction of the heat conductive material was 1:2, exhibited high thermal conductive characteristics and a low sliding part temperature, compared with Example 1. This reveals the effectiveness of increasing the flatness ratio of the heat conductive material in the coating layer of the bearing member.

Example 3, in which the ratio (Lb:Lc) of the length in the axial direction and the length in the circumferential direction of the heat conductive material was 1:4, exhibited the highest thermal conductive characteristics among Examples and exhibited low temperature at the sliding part. This reveals the effectiveness of setting the length in the circumferential direction three times or more longer than the length in the axial direction of the heat conductive material of the bearing member.

Each of Examples 4 and 6 exhibited high thermal conductive characteristics and a low sliding part temperature because the distribution density of the heat conductive material in the thickness direction of the coating layer was varied. In particular, Example 4, in which the distribution density of the heat conductive material was varied from high to low in the direction from the surface of the coating layer to the center of the shaft hole, exhibited the lowest sliding part temperature and exhibited thermal conductive characteristics higher than that of Example 6, which had a density relationship of the distribution density reverse to that of Example 4. This reveals the effectiveness of relatively increasing the distribution density of the heat conductive material in the surface-side region of the coating layer of the bearing member.

As described above, in the bearing member of the present invention, the thermal conductive characteristics of the coating layer itself are enhanced mainly by the heat conductive material dispersed in the coating layer. As a result, the thermal conductive characteristics in the directions along the inner circumferential surface of the shaft hole are enhanced. Thus, heat dissipation is improved, whereby temperature rise due to rotational sliding contact with the shaft body is suppressed, and seizure resistance is improved.

As it is clear from Table 1 and FIG. 9, in the bearing member, the thermal conductive characteristics were greatly enhanced, and the sliding part temperature was clearly lowered, whereby seizure resistance was improved, compared with Comparative Example 1 containing only copper in the coating layer. Thus, in a case in which the bearing member is reduced in the axial length, the sliding part temperature does not rise so high as to reach a seizing temperature although a frictional force increases with increase in surface pressure. Accordingly, both securing seizure resistance and reducing the axial length can be achieved.

The bearing member of the present invention is not limited to the structures of the foregoing embodiment and Examples and can be changed or modified unless departing from the gist of the present invention. Although a cylindrical sliding bearing is exemplified as the bearing member in the embodiment, the bearing member may be a bearing part as in the embodiment and may be any type of member that has a function equivalent to a bearing.

REFERENCE SIGNS LIST

1 Bearing member
1A Shaft hole
2 Shaft body
3 Coating layer
3A Base material
3B Heat conductive material
A Thickness direction of the coating layer
B Axial direction of the coating layer (direction along the surface of the coating layer)
C Circumferential direction of the coating layer (direction along the surface of the coating layer)
La Length in the axial direction of the heat conductive material
Lb Length in the axial direction of the heat conductive material
Lc Length in the circumferential direction of the heat conductive material

The invention claimed is:

1. A bearing member, comprising: a coating layer on an inner circumferential surface of a shaft hole into which a shaft body is to be fitted,
   the coating layer containing a metal base material and a heat conductive material that is dispersed in the base material and that has a thermal conductivity relatively higher than that of the base material,
   the heat conductive material having a length in a direction along a surface of the coating layer, longer than a length in a thickness direction of the coating layer, and having a length in a circumferential direction of the shaft hole, longer than a length in an axial direction of the shaft hole.

2. The bearing member according to claim 1, wherein the heat conductive material has a distribution density that is relatively high in a surface-side region of the coating layer in the thickness direction of the coating layer.

3. The bearing member according to claim 1, wherein the heat conductive material is made of graphite or graphene.

4. The bearing member according to claim 1, wherein a thermal conductivity in the direction along the surface of the coating layer is 90 W/m·k or greater.

5. The bearing member according to claim 1, wherein the heat conductive material is dispersed at a ratio of 15 wt % or greater and 90 wt % or less with respect to the base material.

6. The bearing member according to claim 1, wherein the base material is made of copper or copper alloy and has Vickers hardness of 45 HV or greater.

7. The bearing member according to claim 1, further comprising an over coating layer on the surface of the coating layer.

8. The bearing member according to claim 1, wherein the inner circumferential surface of the shaft hole has a surface roughness Ra of 0.3 μm or less.

9. The bearing member according to claim 1, wherein an exposure rate of the heat conductive material at the surface of the coating layer is 5% or greater and 60% or less.

10. The bearing member according to claim 1, wherein the inner circumferential surface of the shaft hole and the shaft body come into sliding contact with each other in the presence of a lubricating oil containing a friction modifier.

11. The bearing member according to claim 1, wherein, in the heat conductive material, the length in the circumferential direction of the shaft hole is three times or more longer than the length in the axial direction of the shaft hole.

12. The bearing member according to claim 11, wherein the heat conductive material has a distribution density that is relatively high in a surface-side region of the coating layer in the thickness direction of the coating layer.

13. The bearing member according to claim 11, wherein the heat conductive material is made of graphite or graphene.

14. The bearing member according to claim 11, wherein a thermal conductivity in the direction along the surface of the coating layer is 90 W/m·k or greater.

15. The bearing member according to claim 11, wherein the heat conductive material is dispersed at a ratio of 15 wt % or greater and 90 wt % or less with respect to the base material.

16. The bearing member according to claim 11, wherein the base material is made of copper or copper alloy and has Vickers hardness of 45 HV or greater.

17. The bearing member according to claim 11, further comprising an over coating layer on the surface of the coating layer.

18. The bearing member according to claim 11, wherein the inner circumferential surface of the shaft hole has a surface roughness Ra of 0.3 µm or less.

19. The bearing member according to claim 11, wherein an exposure rate of the heat conductive material at the surface of the coating layer is 5% or greater and 60% or less.

20. The bearing member according to claim 11, wherein the inner circumferential surface of the shaft hole and the shaft body come into sliding contact with each other in the presence of a lubricating oil containing a friction modifier.

* * * * *